US012506909B2

(12) United States Patent
Parikh et al.

(10) Patent No.: US 12,506,909 B2
(45) Date of Patent: Dec. 23, 2025

(54) OFFLOADING STREAM PROCESSING TASKS TO PARALLEL PROCESSING UNITS FOR CONTENT STREAMING SYSTEMS AND APPLICATIONS

(71) Applicant: NVIDIA Corporation, Santa Clara, CA (US)

(72) Inventors: Amit Parikh, Santa Clara, CA (US); Ganapathy Raman Kasi, Fremont, CA (US); Olivier Lapicque, Deerfield Beach, FL (US)

(73) Assignee: NVIDIA Corporation, Santa Clara, CA (US)

( * ) Notice: Subject to any disclaimer, the term of this patent is extended or adjusted under 35 U.S.C. 154(b) by 171 days.

(21) Appl. No.: 18/331,757

(22) Filed: Jun. 8, 2023

(65) Prior Publication Data

US 2024/0414384 A1 Dec. 12, 2024

(51) Int. Cl.
*H04N 21/2347* (2011.01)
*H04L 9/40* (2022.01)

(52) U.S. Cl.
CPC ..... *H04N 21/2347* (2013.01); *H04L 63/0457* (2013.01)

(58) Field of Classification Search
CPC ............ H04N 21/2347; H04L 63/0457; H04L 63/0428
See application file for complete search history.

(56) References Cited

U.S. PATENT DOCUMENTS

| 10,229,651 | B2   | 3/2019  | Cook et al.  |              |
|------------|------|---------|--------------|--------------|
| 10,497,168 | B2   | 12/2019 | Huang et al. |              |
| 10,630,077 | B2   | 4/2020  | Utamaru      |              |
| 11,082,490 | B2   | 8/2021  | Huang et al. |              |
| 11,100,197 | B1 * | 8/2021  | Bernardi     | H04L 51/18   |
| 11,683,325 | B2   | 6/2023  | Rule et al.  |              |
| 2016/0029002 | A1 * | 1/2016 | Balko      | H04N 21/4437 |
|            |      |         |              | 386/230      |
| 2020/0296447 | A1 * | 9/2020 | Chakraborty | H04N 21/4408 |
| 2023/0231721 | A1 * | 7/2023 | Liang      | H04N 21/2347 |
|            |      |         |              | 713/170      |

* cited by examiner

*Primary Examiner* — Mohammad W Reza
(74) *Attorney, Agent, or Firm* — Iron Summit IP LLP

(57) ABSTRACT

In various examples, processing content data using graphics processing units for video streaming systems and applications is described herein. Systems and methods are disclosed that offload at least a portion of the processing that is typically performed by a central processing unit (CPU) to a graphics processing unit (GPU). For example, and for a streaming application, the GPU may initially generate and then encode a content stream (e.g., a video stream, an audio stream, etc.). In some examples, the GPU generates and/or encodes the content stream based on input data received from one or more client devices. The GPU may then perform additional processing associated with the encoded content stream, such as packetization, forward error correction (FEC), encryption, and/or any other processing. The CPU may then use packet pacing when causing the processed content stream to be streamed to the client device(s).

20 Claims, 12 Drawing Sheets

OFFLOADING STREAM PROCESSING TASKS TO PARALLEL PROCESSING UNITS FOR CONTENT STREAMING SYSTEMS AND APPLICATIONS

BACKGROUND

Conventional systems include processing pipelines that process content for various applications, such as online gaming applications, video streaming applications, and/or the like. For example, when an online gaming application is being streamed to a connected client device, a conventional system may use a graphics processing unit (GPU) to generate and then encode a video stream associated with the online gaming application. The conventional system may then process the video data and/or associated audio data using a central processing unit (CPU). For example, the CPU may process the video data and/or the audio data using a processing stack, such as a processing stack that performs packetization, forward error correction (FEC), and/or encryption. After processing the video stream and/or the audio stream using the CPU, the conventional system may then send the processed video data and/or the processed audio data to the client device.

However, problems may occur when generating encoded video streams using a GPU that are then further processed using a CPU. For instance, in some scenarios, a GPU may be encoding multiple video streams associated with different application sessions at a single instance, where each of the encoded video streams then needs to be processed using a video processing stack of a CPU before sending to the client devices. However, processing the multiple encoded video streams using the CPU may require a large amount of CPU resources and/or may increase the latency associated with the CPU processing. Additionally, in some scenarios, a configuration associated with a video stream may dedicate a given number of cores of a CPU to the video stream, such as two cores or three cores. However, based on an application associated with the video stream, the CPU may be unable to process the video stream using the number of cores without increasing the processing latency and/or reducing the frame rate of the video stream. As such, and in such scenarios, the conventional systems may need to increase the number of cores to dedicate to the video stream.

SUMMARY

Embodiments of the present disclosure relate to processing content data using graphics processing units (or other parallel processing units or hardware accelerators) for video streaming systems and applications. Systems and methods are disclosed that offload at least a portion of the processing that is typically performed by a central processing unit (CPU) to a graphics processing unit (GPU). For example, and for a streaming application, the GPU may initially generate and then encode a content stream (e.g., a video stream, an audio stream, etc.). In some examples, the GPU generates and/or encodes the content stream based on input data received from one or more client devices. The GPU may then perform additional processing associated with the encoded content stream, such as packetization, forward error correction (FEC), encryption, and/or any other processing. The CPU may then use packet pacing when causing the processed content stream to be sent to the client device(s).

In contrast to conventional systems, such as those described herein, the current systems, in some embodiments, are able to use a GPU to perform at least a portion of the processing that is conventionally performed by the processing stack of the CPU. For instance, and as described herein, the processing stack of the CPU of the conventional systems may process the content stream using at least packetization, FEC, and/or encryption. However, by moving at least a portion of the processing of the content stream to the GPU, such as the packetization, the FEC, and/or the encryption, the current systems are able to reduce the latency associated with processing the content stream and/or reduce the amount of CPU resources that is needed for processing the content stream. In some examples, such improvements are even more prevalent in specific scenarios, such as when a GPU is being used generate and/or encode multiple content streams in parallel and/or a CPU is executing multiple threads on different cores.

BRIEF DESCRIPTION OF THE DRAWINGS

The present systems and methods for processing content data using graphics processing units for video streaming systems and applications are described in detail below with reference to the attached drawing figures, wherein.

DETAILED DESCRIPTION

Figure 1:
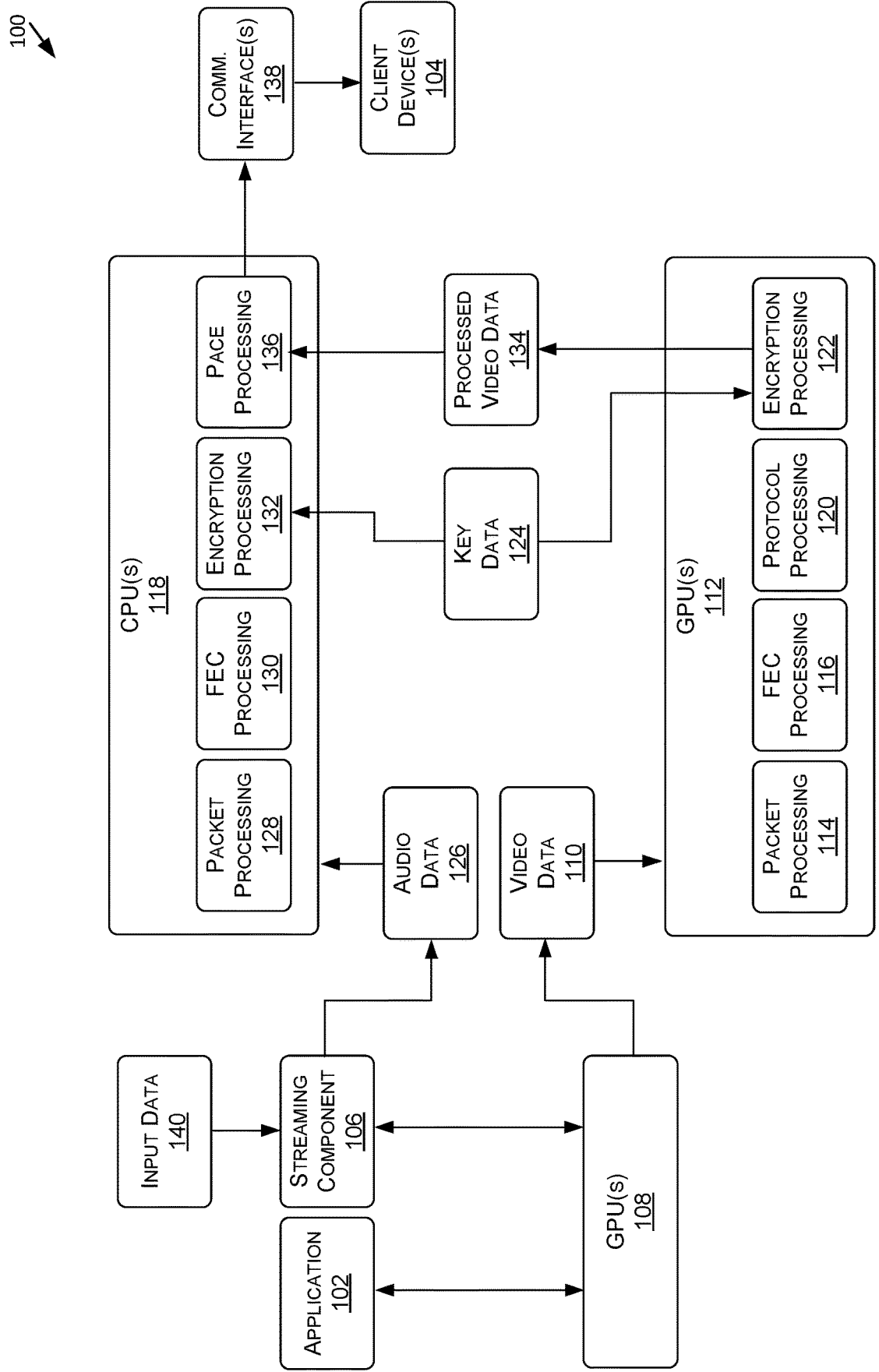
FIG. 1 illustrates an example data flow diagram for a process of processing content data using one or more graphics processing units, in accordance with some embodiments of the present disclosure.

Systems and methods are disclosed related to processing content data using graphics processing units for video streaming systems and applications. Disclosed embodiments may be comprised in a variety of different systems such as streaming systems (e.g., game streaming systems), automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for processing data, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

For instance, a system(s) may be providing one or more content streams associated with one or more applications to one or more client devices. As described herein, a content stream may include a game stream associated with a gaming application, a movie stream associated with a video streaming application, a content stream associated with a (collaborative) content creation application, a content stream associated with a communications application, and/or other type of data stream associated with any other type of application. For example, and for a session associated with a gaming application, the system(s) may receive data from a client device, such as input data representing one or more inputs received by the client device during the session. The system(s) may then process the input data and, based at least on the processing, generate content data (e.g., video data, audio data, etc.) associated with the session. As described herein, the system(s) may use one or more graphics processing units (GPU(s)) and/or one or more central processing units (CPU(s)) to generate the content data. The system(s) may then send the content data to the client device so that the client device is able to provide content represented by the content data to a user. This process may then continue to repeat during the session between the system(s) and the client device.

As described herein, the system(s) may use the GPU(s) to perform at least a first portion of the processing associated with the content data and/or use the CPU(s) to perform at least a second portion of the processing associated with the content data. For example, the system(s) may initially use the GPU(s) to generate and/or encode video data (e.g., with may represent a video stream) associated with the session. As described herein, the GPU(s) may use the input data when generating the video data. The system(s) may then use the GPU(s) to perform additional processing associated with the video data. For instance, in some examples, the system(s) may use the GPU(s) to process the video data using packetization. As described herein, packetization may include at least separating the video data into data packets. For example, if the video data represents frames of a first size (e.g., 20,000 bytes), then packetization may include separating the frames into data packets of a second size (e.g., 1,200 bytes).

Additionally, or alternatively, in some examples, the system(s) may use the GPU(s) to process the video data (e.g., the data packets associated with the video data) using forward error correction (FEC). As described herein, the system(s) may use FEC in order to control the errors in the data transmission between the system(s) and the client device. For example, FEC may include encoding the video data in a redundant manner, such as by using an error correction code (also known as an error correcting code). In some examples, performing FEC on the GPU(s) may reduce the latency associated with the FEC since FEC may include performing one or more matrix operations.

Additionally, or alternatively, in some examples, the system(s) may use the GPU(s) to encrypt at least a portion of the video data (e.g., the data packets associated with the video data) using one or more encryption techniques. As described herein, an encryption technique may include, but is not limited to, Advanced Encryption Standard (e.g., AES-128, AES-192, AES-256, etc.), Data Encryption Standard (DES), Rivest-Shamir-Alderman (RSA) encryption, line inversion encryption, adaptive streaming encryption, region specific streaming encryption, and/or any other encryption technique. In some examples, the GPU(s) receives and/or generates one or more encryption keys when performing the encryption. For example, during a session associated with an application, the system(s) may receive, from the client device, the encryption key that the GPU(s) uses to encrypt the video data.

In some examples, the system(s) may use the GPU(s) and/or the CPU(s) to process additional types of the content data. For instance, the system(s) may use the CPU(s) to process audio data, and/or metadata that is associated with the video data. As described herein, the CPU(s) may process the audio data using one or more similar and/or one or more additional processing techniques as compared to the GPU(s). For example, the CPU(s) may process the audio data using at least packetization, FEC, and/or encryption. However, in other examples, and similar to the processing of the video data, the system(s) may use the GPU(s) to perform at least a portion of the processing of the audio data.

In some examples, the system(s) may then use the CPU(s) and/or the GPU(s) to further process the content data before sending the content data to the client device. For example, the system(s) may use the CPU(s) to further process the processed video data and/or the processed audio data using packet pacing before sending the processed video data and/or the processed audio data to the client device. As described herein, packet pacing may include evenly spacing the data transmissions (e.g., the data packets) that are sent from the system(s) to the client device.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems implementing large language models, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process 100 of processing content data using graphics processing pipelines, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software, alone or in any combination. For instance, various functions may be carried out by a processor executing instructions stored in memory.

The process 100 may include executing an application 102. As described herein, the application 102 may include, but is not limited to, a gaming application, a multimedia application (e.g., a video streaming application, a music streaming application, a voice streaming application, a multimedia streaming application that includes both audio and video, etc.), a communications application (e.g., a video conferencing application, etc.), an educational application, a collaborative content creation application, and/or any other type of application. For example, the application 102 may include a gaming application that is being provided by one or more remote servers, such as one or more application servers 1002, to one or more client devices 104 (which may represent, and/or include, one or more client devices 1004). In such an example, the remote server(s) may be providing an application session to the client device(s) 104 via one or more networks.

The process 100 may include a streaming component 106 that provides data to one or more graphics processing units (GPU(s)) 108. For instance, the streaming component 106 may receive data from the client device(s) 104, such as input data representing one or more inputs. In some examples, the streaming component 106 may then process the input data using one or more processes, such as to update the application session based on the input(s). The streaming component 106 may then send the data to the GPU(s) 108 in order to cause the GPU(s) 108 to generate one or more renderings associated with the application session. For instance, the GPU(s) 108 may use the data to generate video data 110 associated with the application session, where the video data 110 represents one or more frames (e.g., a video stream) rendered by the GPU(s) 108. In some examples, the GPU(s) 108 may perform further processing on the video data 110. For example, the GPU(s) 108 may encode the video data 110, using one or more video encoding techniques, in order to transform the video data 110 from one video format to another video format.

The process 100 may include using one or more graphics processing units (GPU(s)) 112 to further process the video data 110 (e.g., the encoded video data 110). In some examples, the GPU(s) 108 used to generate and/or encode the video data 110 may include the same GPU(s) 112 used to further process the video data 110. In other examples, one or more of the GPU(s) 108 used to generate and/or encode the video data 110 may be different than one or more of the GPU(s) 112 used to further process the video data 110.

For instance, and as shown, in some examples, the process 100 may include the GPU(s) 112 processing the video data 110 using one or more processes 114 associated with packetization. As described herein, packetization may include breaking the video data 110 into chunks, which may be referred to as data packets. For example, if the video data 110 represents frames that include a first data size (e.g., 20,000 bytes), then the packetization may include breaking the frames into a number of data packets that include a second data size (e.g., 1,200 bytes) that is less than the first data size. In some examples, a data packet may be composed of one or more elements. For example, a data packet may include, but is not limited to, a header that includes information (e.g., an origin, a destination, a length, a packet number, etc.) associated with the data packet, a payload that includes the portion of the video data 110, and/or a trailer that indicates an end of the data packet and/or includes error detection and correction information.

Figure 2:
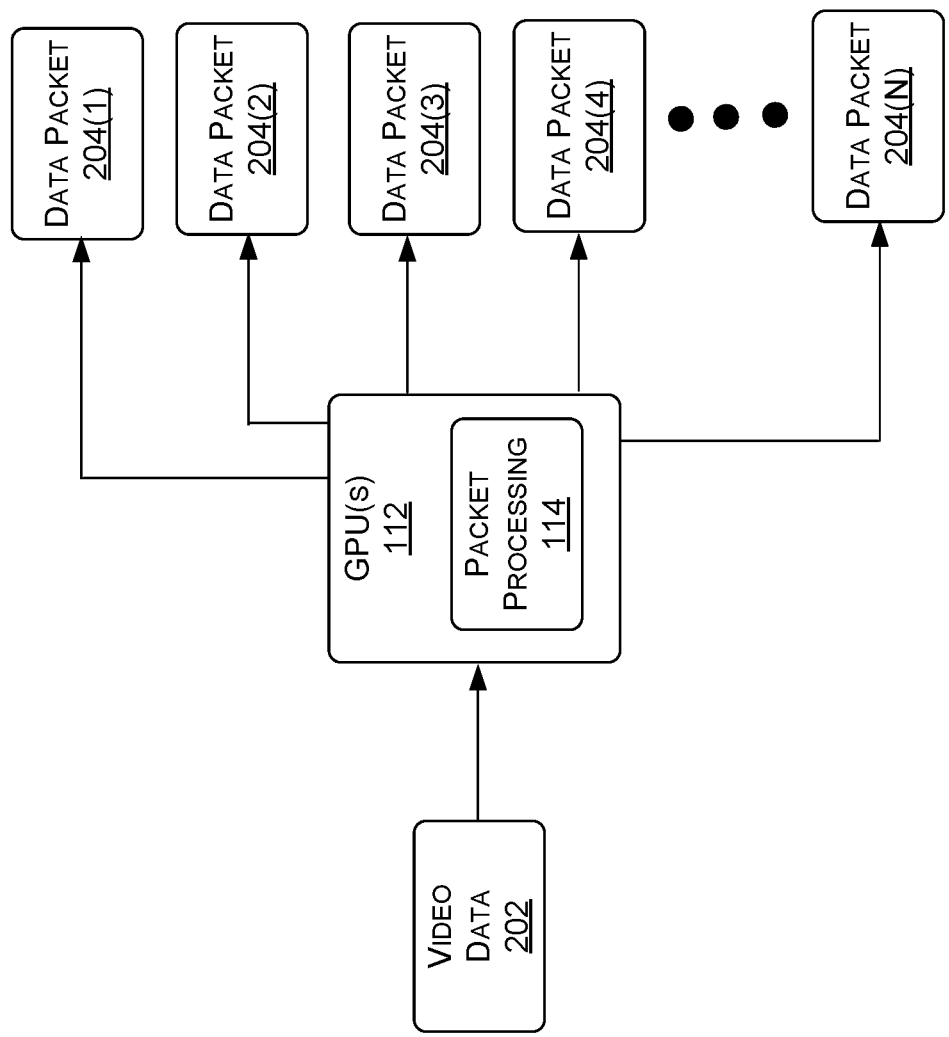
FIG. 2 illustrates an example of one or more graphics processing units processing video data using packetization, in accordance with some embodiments of the present disclosure.

For instance, FIG. 2 illustrates an example of the GPU(s) 112 performing packet processing 114 on video data 202 (which may represent, and/or include, the video data 110), in accordance with some embodiments of the present disclosure. As shown, the GPU(s) 112 may process the video data 202 using the packet processing 114 and, based at least on the processing, generate data packets 204(1)-(N) (also referred to singularly as "data packet 204" or in plural as "data packets 204") associated with the video data 202. In some examples, each of the data packets 204 may include approximately a same amount of data. In some examples, one or more of the data packets 204 may include an amount of data that differs from one or more other data packets 204. Still, in some examples, the GPU(s) 112 may generate the data packets 204 to represent portions of the video data 202. For example, the packet processing 114 may generate groups of data packets 204, where a group of data packets 204 includes data for one or more frames represented by the video data 202.

Referring back to the example of FIG. 1, in some examples, the process 100 may include the GPU(s) 112 processing the video data 110 using one or more processes 116 associated with forward error correction (FEC). As described herein, the GPU(s) 112 may use FEC in order to control (mitigate) the errors and lost packets in the data transmission with the client device(s) 104. For example, FEC may include encoding the video data 110 (e.g., the data packets) in a redundant manner, such as by using an error correction code. This redundancy may then allow the client device(s) 104 to not only detect lost packets that may occur with the transmission of the video data 110, but also compensate for one or more of the errors. In some examples, the FEC processing 116 that is performed on the video data 110 may include one or more matrix operations. In such examples, the GPU(s) 112 may be capable of performing the matrix operation(s) faster than one or more central processing units (CPU(s)) 118 described herein. For example, such is if the FEC processing 116 includes performing multiple matrix operations, the GPU(s) 112 may be capable of performing the matrix operations in parallel. As described herein, this may reduce the latency associated with processing the video data 110.

Figure 3:
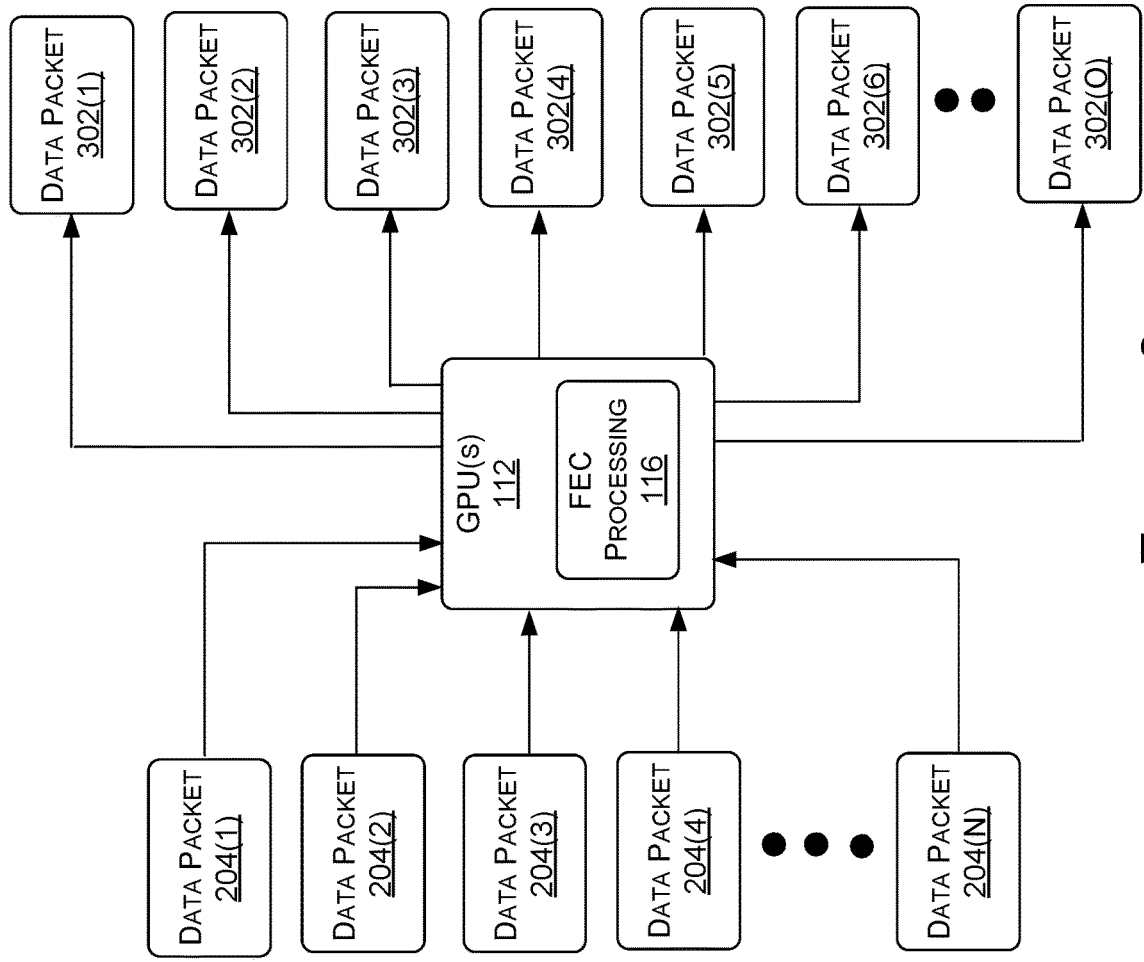
FIG. 3 illustrates an example of one or more graphics processing units processing video data using forward error correction, in accordance with some embodiments of the present disclosure.

For instance, FIG. 3 illustrates an example of the GPU(s) 112 processing the video data 202 using FEC processing 116, in accordance with some embodiments of the present disclosure. As shown, the GPU(s) 112 may process the data packets 204 associated with the video data 202 using the FEC processing 116. Based at least on the processing, the GPU(s) 112 may generate processed data packets 302(1)-(O) (also referred to singularly as "data packet 302" or in plural as "data packets 302"). In some examples, a first number of the data packets 204 is the same as a second number of the data packets 302. In some examples, the first number of the data packets 204 is different than the second number of the data packets 302. For instance, the second number of the data packets 302 may depend on the first number of the data packets 204 and a rate associated with the FEC processing 116. For a first example, if the first number of the data packets 204 includes 20 data packets and the rate associated with the FEC processing 116 is 20%, then the second number of the data packets 302 may include 24 data packets. For a second example, if the first number of the data packets 204 includes 100 data packets and the rate associated with the FEC processing 116 is 30%, then the second number of the data packets 302 may include 130 data packets.

Referring back to the example of FIG. 1, in some examples, the process 100 may include the GPU(s) 112 processing the video data 110 using one or more processes 120 associated with one or more transport protocols. As described herein, a network protocol may include, but is not limited to, Real-Time Transport Protocol (RTP), Transmission Control Protocol (TCP), User Datagram Protocol (UDP), Session Announcement Protocol (SAP), Session Description Protocol (SDP), and/or any other network protocol. For instance, the protocol processing 120 may include encoding the video data 110 according to the transport protocol(s). For example, if the network protocol(s) incudes RTP, then the protocol processing 120 may include encoding the data packets associated with the video data 110 based on the RTP. For instance, based at least on the processing, the data packets may include one or more fields associated with the RTP.

Figure 4:
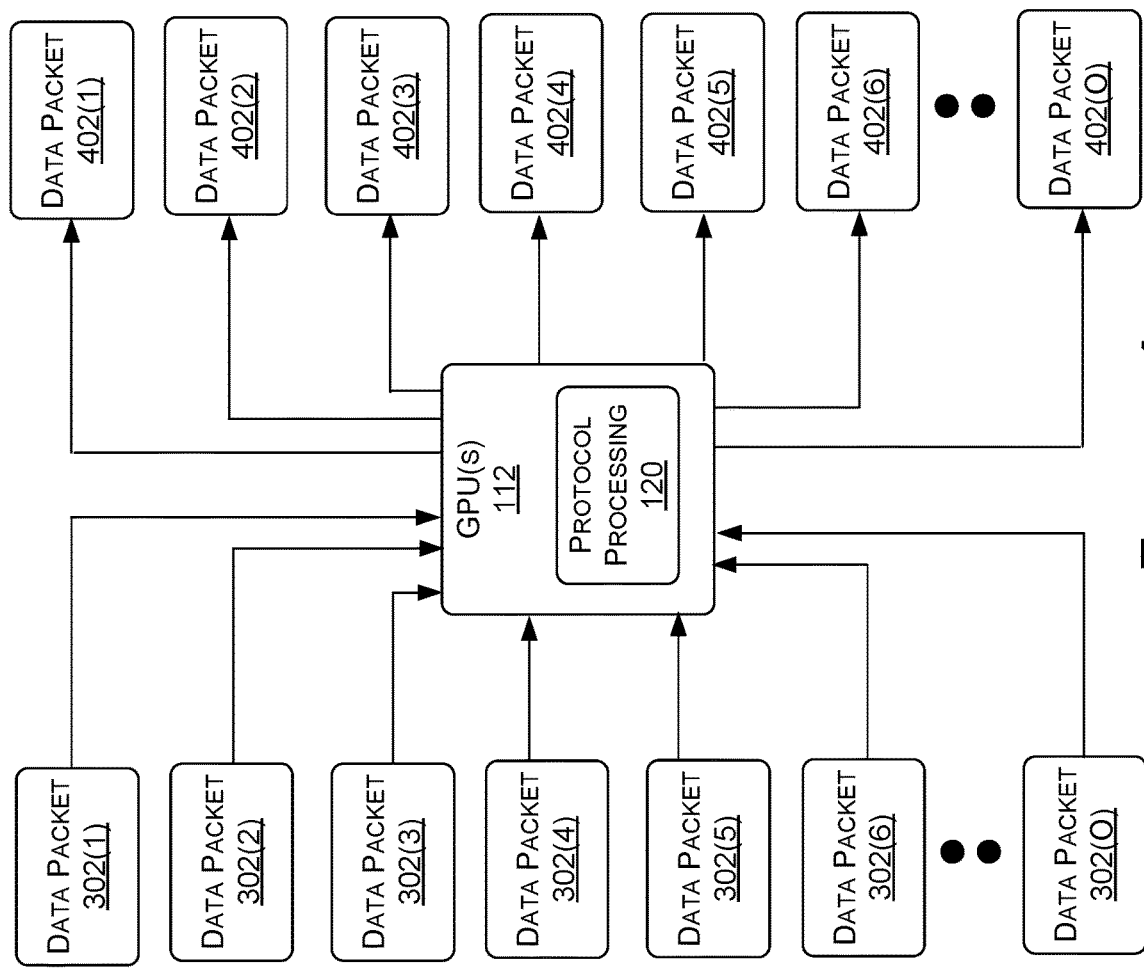
FIG. 4 illustrates an example of one or more graphics processing units encoding video data, in accordance with some embodiments of the present disclosure.

For instance, FIG. 4 illustrates an example of the GPU(s) 112 encoding the video data 202 using protocol processing 120, in accordance with some embodiments of the present disclosure. As shown, the GPU(s) 112 may process the data packets 402 associated with the video data 202 using the protocol processing 120. Based at least on the processing, the GPU(s) 112 may generate processed data packets 402(1)-(O) (also referred to singularly as "data packet 402" or in plural as "data packets 402"). As described herein, the protocol processing 120 of the data packets 302 may include encoding the data packets 302 according to a specific network protocol. For example, if the network protocol includes RTP, then the data packets 402 may include a number of fields such as, but not limited to, a version field, a padding field, an extension field, a number of identifiers field, a payload type field, a sequence number field, a timestamp field, a synchronization source identifier field, a contributing source identifier field, a header extension field, and/or any other field associated with the RTP.

Referring back to the example of FIG. 1, in some examples, the process 100 may include the GPU(s) 112 processing the video data 110 using one or more processes 122 associated with encryption. As described herein, the encryption performed during the encryption processing 122 may include, but is not limited to, AES (e.g., AES-128, AES-192, AES-256, etc.), DES, RSA encryption, line inversion encryption, adaptive streaming encryption, region specific streaming encryption, and/or any other encryption technique. For a first example, the GPU(s) 112 may process the video data 110 using the encryption processing 122 in order to generate encrypted video data 110. For a second example, such as when the video data 110 is processed using the packet processing 114, the GPU(s) 112 may process the data packets associated with the video data 110 in order to generate encrypted data packets.

As shown by the example of FIG. 1, the encryption processing 122 may use an encryption key, which is represented in FIG. 1 by key data 124, in order to encrypt the video data 110. In some examples, the encryption key is associated with the application session between the remote server(s) and the client device(s) 104. For instance, the GPU(s) 112 may receive, generate, and/or retrieve a respective new encryption key for one or more (e.g., each) application session. In some examples, the client device(s) 104 associated with the application session may provide the encryption key that the GPU(s) 112 uses during the application session. For instance, at the start of the application session, the client device(s) 104 may send the key data 124 to the remote server(s) so that the remote server(s) is able to provide the GPU(s) 112 with the encryption key. Still, in some examples, and as described in more detail herein, the CPU(s) 118 may use the same encryption key when encrypting data associated with the application session.

Figure 5:
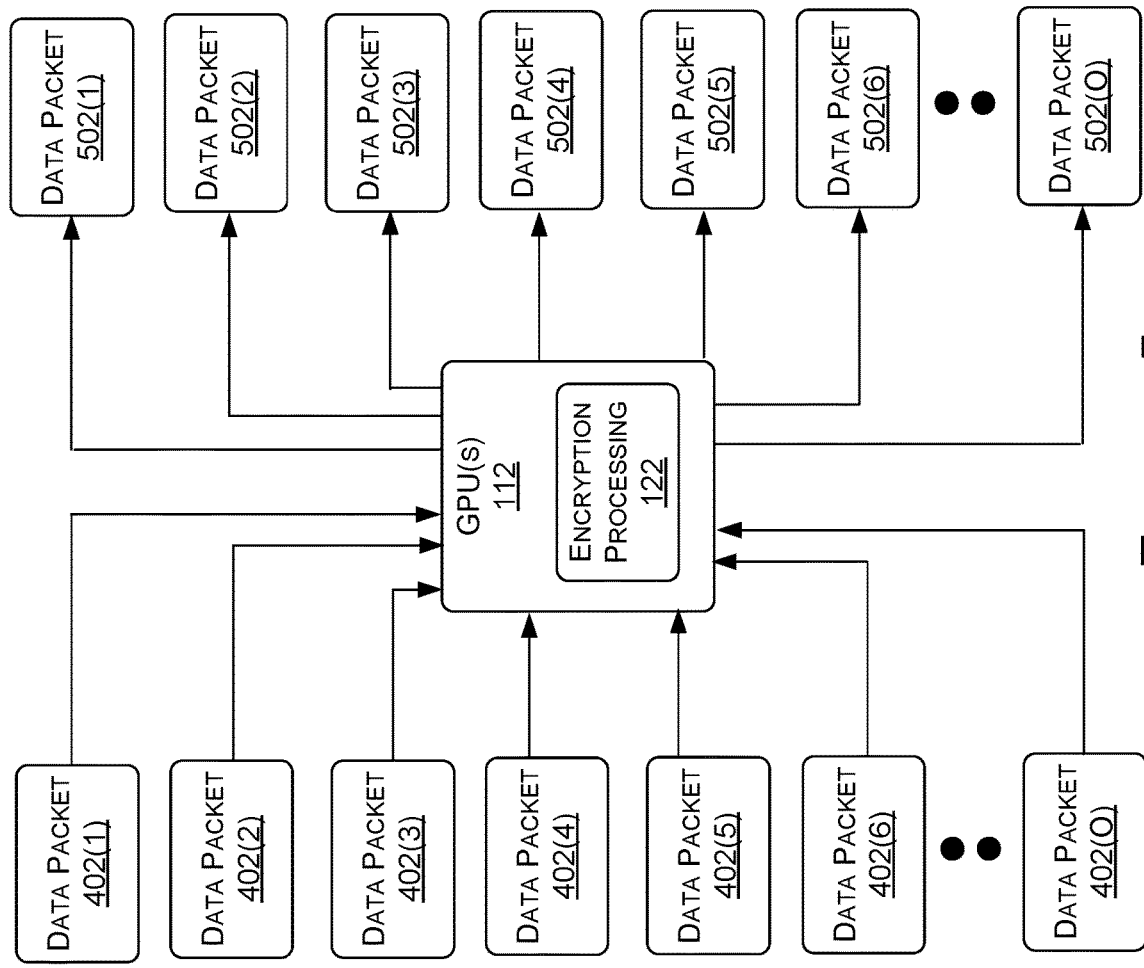
FIG. 5 illustrates an example of one or more graphics processing units encrypting video data, in accordance with some embodiments of the present disclosure.

For instance, FIG. 5 illustrates an example of the GPU(s) 112 encrypting the video data 202, in accordance with some embodiments of the present disclosure. As shown, the GPU(s) 112 may process the data packets 502 associated with the video data 202 using the encryption processing 122. Based at least on the processing, the GPU(s) 112 may generate encrypted data packets 502(1)-(O) (also referred to singularly as "encrypted data packet 502" or in plural as "encrypted data packets 502"). While the example of FIG. 5 illustrates the encrypted data packets 502 as including a same number of data packets as the data packets 402, in other examples, the encrypted data packets 502 may include less or more data packets as compared to the data packets 402.

Referring back to the example of FIG. 1, while the example of FIG. 1 illustrates the GPU(s) 112 processing the video data 110 using the packet processing 114, the FEC processing 116, the protocol processing 120, and the encryption processing 122, in other examples, the GPU(s) 112 may process the video data 110 using one or more of the packet processing 114, the FEC processing 116, the protocol processing 120, and the encryption processing 122 (e.g., the GPU(s) 112 may not process the video data 110 using the protocol processing 120). Additionally, in some examples, the GPU(s) 112 may process the video data 110 using one or more additional and/or alternative data processing techniques.

The process 100 may include the streaming component 106 outputting audio data 126 associated with the video data 110. For example, the video data 110 may represent the frames rendered for the application session and the audio data 126 may represent the sound that is to be output while displaying the frames. In some examples, the audio data 126 is synchronized with the video data 110 using one or more techniques, such as timestamps indicating times for outputting the sound represented by the audio data 126 and timestamps indicating times for displaying the frames represented by the video data 110. In some examples, the streaming component 106 may encode the audio data 126, such as into a similar format as the video data 110.

The process 100 may include the CPU(s) 118 processing the audio data 126 output by the streaming component 106. For instance, and as shown, in some examples, the process 100 may include the CPU(s) 118 processing the audio data 126 using one or more processes 128 associated with packetization. As described herein, packetization may include breaking the audio data 126 into chunks, which may be referred to as data packets. For example, the packetization may include breaking the audio data 126 into a number of data packets that include a data size such as, but not limited to, 500 bytes, 1,000 bytes, 1,200 bytes, 1,500 bytes, and/or any other size. In some examples, the data packets generated by the CPU(s) 118 during the packet processing 128 may include a same size as the data packets generated by the GPU(s) 112 during the packet processing 114. In some examples, one or more of the data packets generated by the CPU(s) 118 during the packet processing 128 may include a different size than one or more of the data packets generated by the GPU(s) 112 during the packet processing 114.

In some examples, a data packet may be composed of one or more elements. For example, a data packet may include, but is not limited to, a header that includes information (e.g., an origin, a destination, a length, a packet number, etc.) about the data packet, a payload that includes the portion of the audio data 126, and/or a trailer which indicates the end of the data packet and/or includes error detection and correction information.

Figure 6:
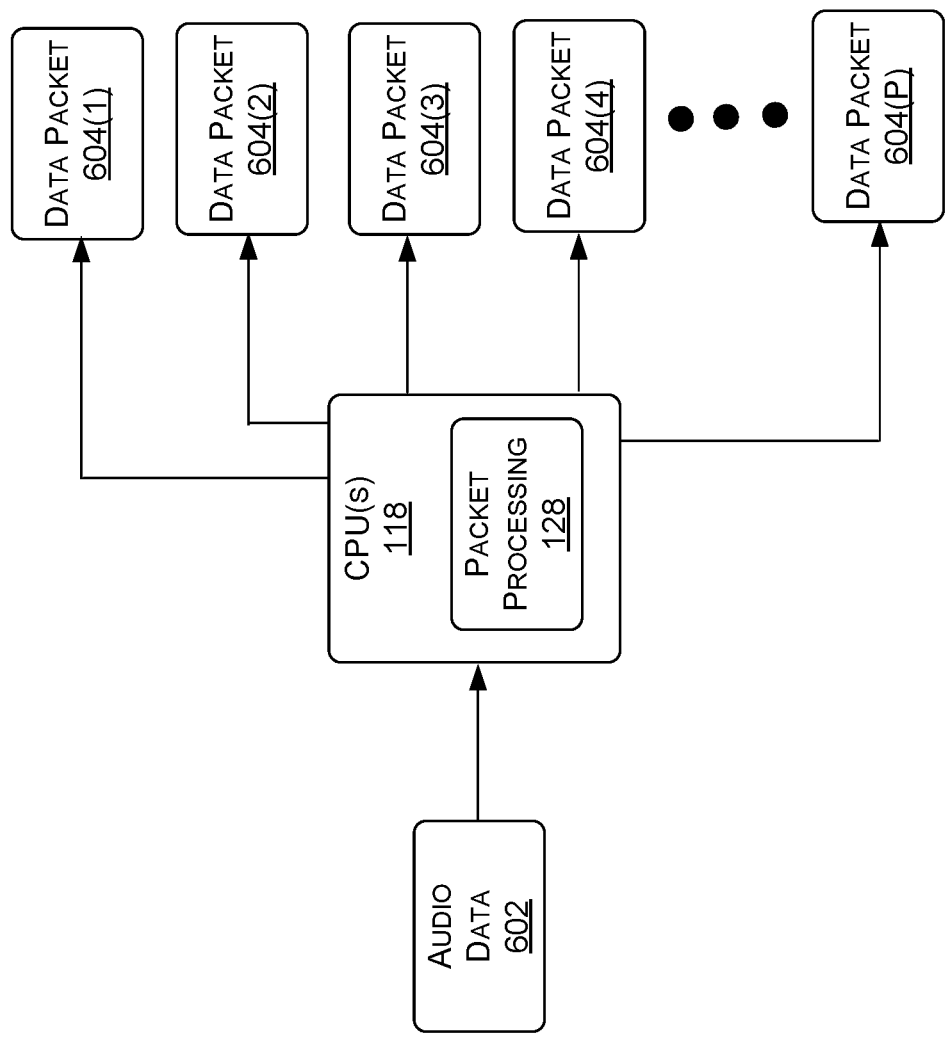
FIG. 6 illustrates an example of one or more central processing units processing audio data using packetization, in accordance with some embodiments of the present disclosure.

For instance, FIG. 6 illustrates an example of the CPU(s) 118 processing audio data 602 (which may represent, and/or include, the audio data 126) using packetization, in accordance with some embodiments of the present disclosure. As shown, the CPU(s) 118 may process the audio data 602 using the packet processing 128 and, based at least on the processing, generate data packets 604(1)-(P) (also referred to singularly as "data packet 604" or in plural as "data packets 604") associated with the audio data 602. In some examples, each of the data packets 604 may include approximately a same amount of data. In some examples, one or more of the data packets 604 may include an amount of data that differs from one or more other data packets 604.

Referring back to the example of FIG. 1, in some examples, the process 100 may include the CPU(s) 118 processing the audio data 126 (e.g., the data packets) using one or more processes 130 associated with FEC. As described herein, the CPU(s) 118 may use the FEC processing 130 in order to control the errors in the data transmission with the client device(s) 104. For example, the FEC processing 130 may include encoding the audio data 126 (e.g., the data packets) in a redundant manner, such as by using an error correction code. This redundancy may then allow the client device(s) 104 to not only detect errors (e.g., lost packets) that may occur with the transmission of the audio data 126, but also compensate for one or more of the errors. In some examples, the FEC processing 130 that is performed by the CPU(s) 118 may be similar to the FEC processing 116 that is performed by the GPU(s) 112. In some examples, the FEC processing 130 that is performed by the CPU(s) 118 may be different than the FEC processing 116 that is performed by the GPU(s) 112.

Figure 7:
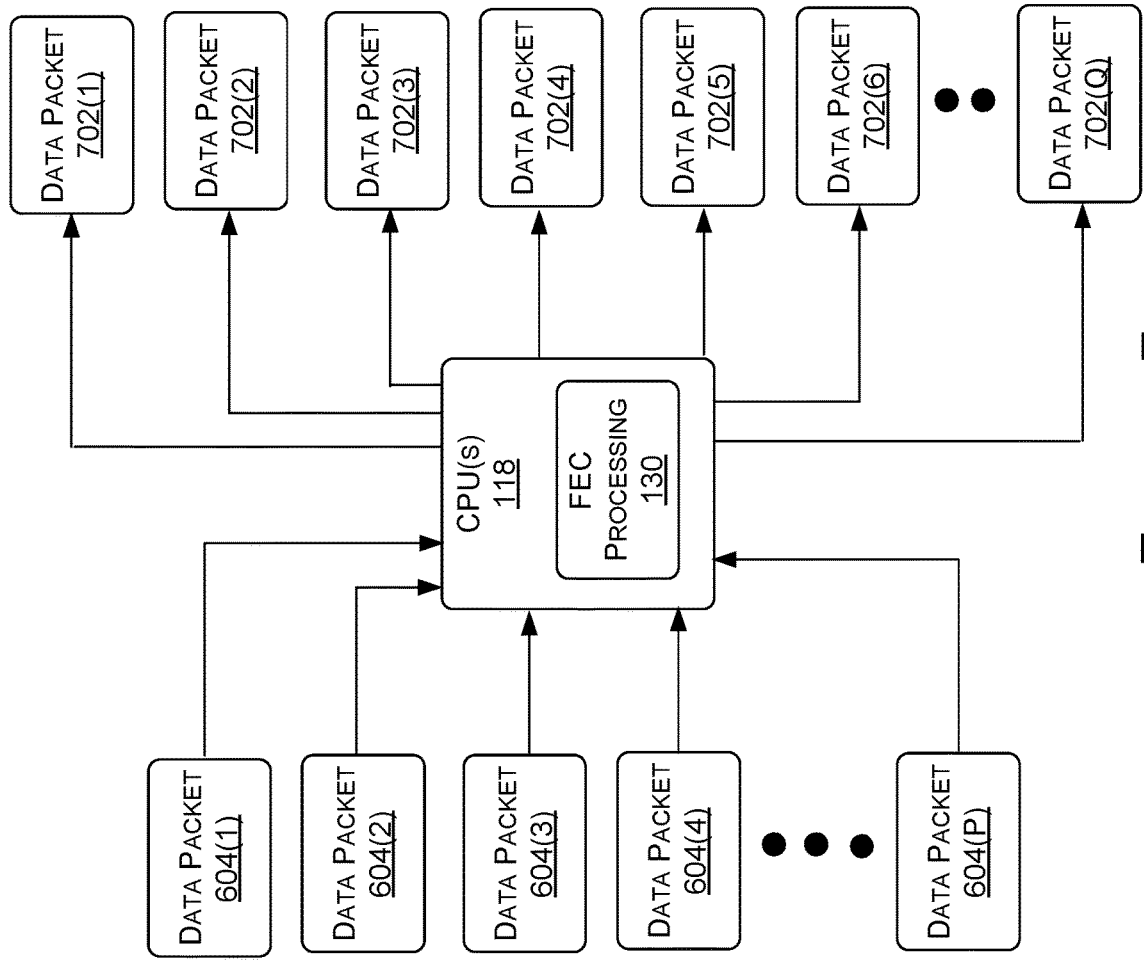
FIG. 7 illustrates an example of one or more central processing units processing audio data using forward error correction, in accordance with some embodiments of the present disclosure.

For instance, FIG. 7 illustrates an example of the CPU(s) 118 processing the audio data 602 using the FEC processing 130, in accordance with some embodiments of the present disclosure. As shown, the CPU(s) 118 may process the data packets 604 associated with the audio data 602 using the FEC processing 130. Based at least on the processing, the CPU(s) 118 may generate processed data packets 702(1)-(Q) (also referred to singularly as "data packet 702" or in plural as "data packets 702"). In some examples, a first number of the data packets 604 is the same as a second number of the data packets 702. In some examples, the first number of the data packets 604 is different than the second number of data packets 702. For instance, the second number of the data packets 702 may depend on the first number of the data packets 604 and a rate associated with the FEC processing 130. For a first example, if the first number of the data packets 604 includes 20 data packets and the rate associated with the FEC processing 130 is 20%, then the second number of the data packets 702 may include 24 data packets. For a second example, if the first number of the data packets 604 includes 100 data packets and the rate associated with the FEC processing 130 is 30%, then the second number of the data packets 702 may include 130 data packets.

Referring back to the example of FIG. 1, in some examples, the process 100 may include the CPU(s) 118 processing the audio data 126 (e.g., the data packets) using one or more processes 132 associated with encryption. As described herein, the encryption performed during the encryption processing 132 may include, but is not limited to, AES (e.g., AES-128, AES-192, AES-256, etc.), DES, RSA encryption, line inversion encryption, adaptive streaming encryption, region specific streaming encryption, and/or any other encryption technique. For a first example, the CPU(s) 118 may process the audio data 126 using the encryption processing 132 in order to generate encrypted audio data 126. For a second example, such as when the audio data 126 is processed using the packet processing 128, the CPU(s) 118 may process the data packets associated with the audio data 126 in order to generate encrypted data packets.

As shown by the example of FIG. 1, the encryption processing 132 may use an encryption key, with is also represented by key data 124, in order to encrypt the audio data 126. As described herein, in some examples, the encryption key is associated with the application session between the remote server(s) and the client device(s) 104. For instance, the CPU(s) 118 may generate and/or retrieve a respective new encryption key for one or more (e.g., each) application session. As described herein, in some examples, the client device(s) 104 associated with the application session may provide the encryption key that the CPU(s) 118 uses during the application session. For instance, at the start of the application session, the client device(s) 104 may send the key data 124 to the remote server(s) so that the remote server(s) is able to provide the CPU(s) 118 with the encryption key. Still, in some examples, the CPU(s) 118 may use the same encryption key as the GPU(s) 112.

Figure 8:
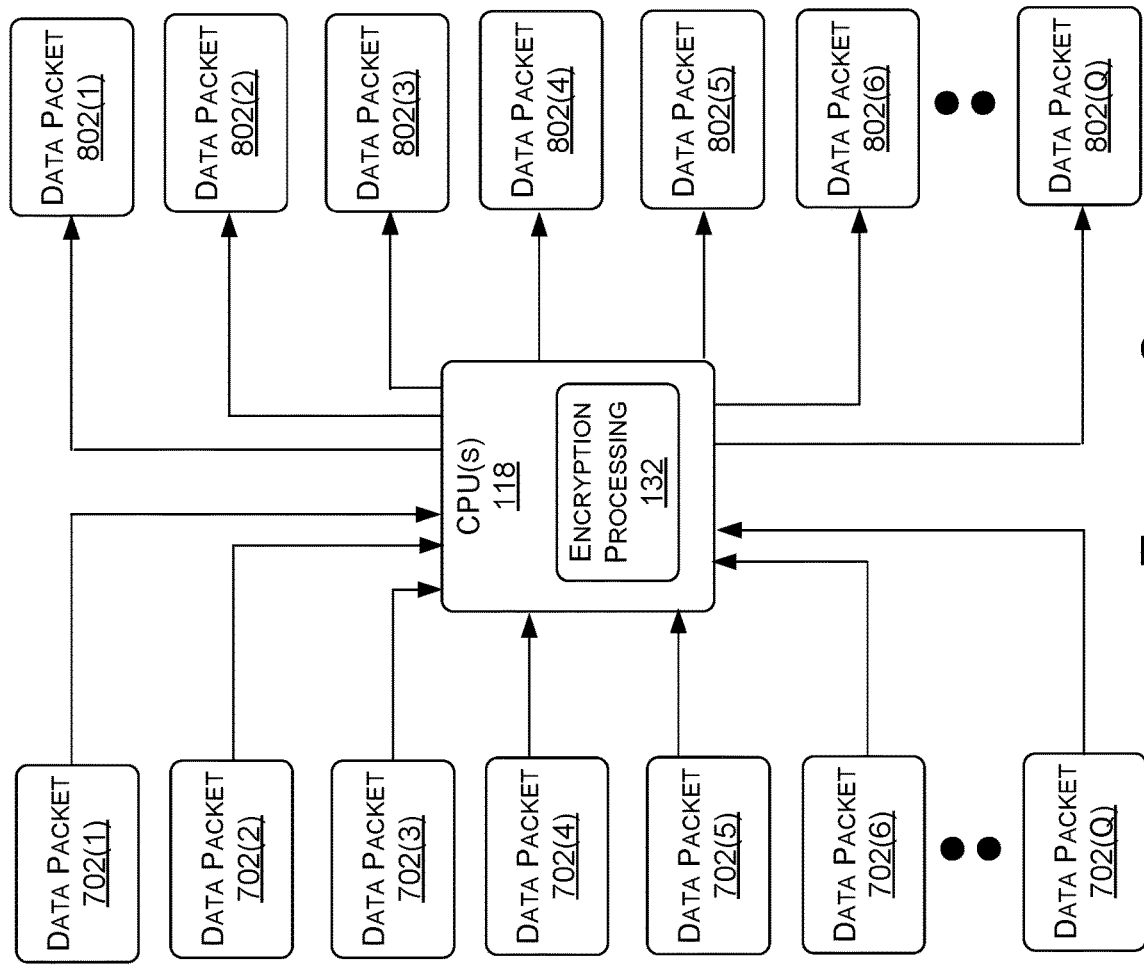
FIG. 8 illustrates an example of one or more central processing units encrypting audio data, in accordance with some embodiments of the present disclosure.

For instance, FIG. 8 illustrates an example of the CPU(s) 118 encrypting the audio data 602, in accordance with some embodiments of the present disclosure. As shown, the CPU(s) 118 may process the data packets 702 associated with the audio data 602 using the encryption processing 132. Based at least on the processing, the CPU(s) 118 may generate encrypted data packets 802(1)-(Q) (also referred to singularly as "encrypted data packet 802" or in plural as "encrypted data packets 802"). While the example of FIG. 8 illustrates the encrypted data packets 802 as including a same number of data packets as the data packets 702, in other examples, the encrypted data packets 802 may include less or more data packets as compared to the data packets 702.

Referring back to the example of FIG. 1, the process 100 may include the CPU(s) 118 processing the video data 110 processed by the GPU(s) 112, which is represented by processed video data 134, and the audio data 126 processed by the CPU(s) 118 using pace processing 136. In some examples, the pace processing 136 may include packet pacing, where the CPU(s) 118 causes the data packets to be substantially evenly sent to the client device(s) 104 using one or more communication interfaces 138 (which may represent, and/or include, a communication interface 1018). However, in other examples, the CPU(s) 118 may use additional and/or alternative processes for sending the processed video data 134 and/or the processed audio data 126 to the client device(s) 104.

In some examples, the process 100 may continue to repeat as the remote server(s) continues to provide content data to the client device(s) 104 during the application session(s). For example, during an application session with a client device 104, the client device 104 may continue to generate and send input data 140 to the remote server(s), where the input data 140 represents one or more inputs received by the client device 104. Based on receiving the input data 140, the remote server(s) may perform the processes described herein to generate the video data 110 and/or the audio data 126 based at least on the input data 140. The remote server(s) may then process the video data 110 and/or the audio data 126 using one or more of the processes described herein. Additionally, the remote server(s) may send the processed video data 110 and/or the processed audio data 126 to the client device 104.

In some examples, the packet processing 114, the FEC processing 116, the protocol processing 120, the encryption processing 122, the packet processing 128, the FEC processing 130, the encryption processing 132, and/or the pace processing 136 may represent hardware and/or software components, engines, modules, and/or the like that perform the processes described herein. For a first example, the GPU(s) 112 may include one or more hardware components and/or one or more software components that perform the packet processing 114, the FEC processing 116, the protocol processing 120, and/or the encryption processing 122. For a second example, the CPU(s) 118 may include one or more hardware components and/or one or more software components that perform the packet processing 128, the FEC processing 130, the encryption processing 132, and/or the pace processing 136.

Additionally, while the example of FIG. 1 illustrates the CPU(s) 118 as performing all of the processing of the audio data 126, in some examples, the GPU(s) 112 may perform at least a portion of the processing of the audio data 126. For example, the GPU(s) 112 may process the audio data 126 using the packet processing 114, the FEC processing 116, and/or the encryption processing 122. Furthermore, while the example of FIG. 1 illustrates the GPU(s) 112 as performing all of the processing of the video data 110, in other examples, the CPU(s) 118 may perform at least a portion of the processing of the audio data 126. For example, the CPU(s) 118 may process the video data 110 using the packet processing 128, the FEC processing 130, the encryption processing 132, and/or the protocol processing 120. In other words, at least a portion of the processing that is performed by the CPU(s) 118, as described herein, may be performed by the GPU(s) 112, and/or at least a portion of the processing that is performed by the GPU(s) 112, as described herein, may be performed by the CPU(s) 118.

In some examples, process 100 may include using one or more techniques to synchronize the processing described herein for the GPU(s) 112 and/or the CPU(s) 118. For example, the process 100 may include using one or more semaphores (e.g., an object(s), a variable(s), etc.) that is shared between the processes (e.g., the processing performed by the GPU(s) 108, the packet processing 114, the FEC processing 116, the protocol processing 120, the encryption processing 122, etc.) and/or the threads in order to synchronize the processing performed by the CPU(s) 112.

As described herein, by processing the content data (e.g., the video data 110, the audio data 126, etc.) using the process 100 from the example of FIG. 1, the remote server(s) may provide one or more improvements. For a first example, the remote server(s) may be able to provide a greater number of application sessions (e.g., two application sessions, four applications sessions, etc.) to multiple client devices 104 using fewer GPU(s) 112 resources and/or fewer CPU(s) 118 resources (e.g., a fewer number of cores). For a second example, the remote server(s) may be able to provide better quality content streams to the client devices 104 during the applications sessions, such as content streams with greater frame rates and/or higher video resolutions.

Figure 9:
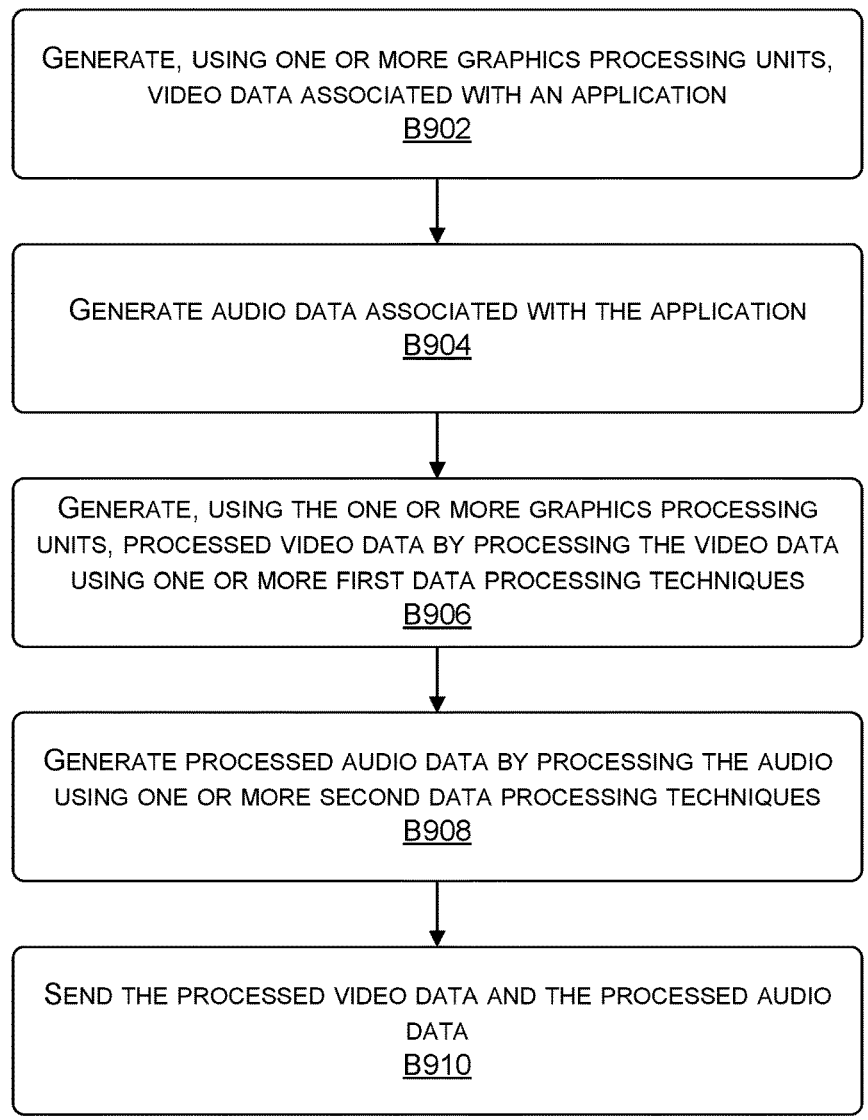
FIG. 9 is a flow diagram showing a method for processing content data using one or more graphics processing units, in accordance with some embodiments of the present disclosure.

Now referring to FIG. 9, each block of method 900, described herein, comprises a computing process that may be performed using any combination of hardware, firmware, and/or software. For instance, various functions may be carried out by a processor executing instructions stored in memory. The method 900 may also be embodied as computer-usable instructions stored on computer storage media. The method 900 may be provided by a standalone application, a service or hosted service (standalone or in combination with another hosted service), or a plug-in to another product, to name a few. In addition, method 900 is described, by way of example, with respect to FIG. 1. However, this method 900 may additionally or alternatively be executed by any one system, or any combination of systems, including, but not limited to, those described herein.

FIG. 9 is a flow diagram showing a method 900 for processing content data using one or more graphics processing units, in accordance with some embodiments of the present disclosure. The method 900, at block B902, may include generating, using one or more graphics processing units, video data associated with an application. For instance, the GPU(s) 108 may generate the video data 110 associated with the application 102. In some examples, the GPU(s) 108 generate the video data 110 based at least on input data 140 received from the client device(s) 104. For example, if the application 102 includes a gaming application, then the input data 140 may represent one or more inputs received by the client device(s) 104, where the input(s) is associated with controlling one or more aspects (e.g., one or more objects, one or more characters, etc.) of the gaming application. As such, the streaming component 106 and/or the CPU(s) 118 may process the input data 140 and then send, to the GPU(s) 108, data that causes the GPU(s) 108 to render the gaming application, which is represented by the video data 110.

The method 900, at block B904, may include generating audio data associated with the application. For instance, the streaming component 106 and/or the CPU(s) 118 may generate the audio data 126 associated with the application 102.

The method 900, at block B906, may include generating, using the one or more graphics processing units, processed video data by processing the video data using one or more first data processing techniques. For instance, the GPU(s) 112 may process the video data 110 using the first data processing technique(s), such as the packet processing 114, the FEC processing 116, the protocol processing 120, the encryption processing 122, and/or any other type of data processing. Based at least on the processing, the GPU(s) 112 may generate the processed video data 134 associated with the video data 110.

The method 900, at block B908, may include generating processed audio data by processing the audio data using one or more second data processing technique. For instance, in some examples, the CPU(s) 118 may process the audio data 126 using the second data processing technique(s), such as the packet processing 128, the FEC processing 130, the encryption processing 132, and/or any other type of data processing. Additionally, or alternatively, in some examples, the GPU(s) 112 may process the audio data 126 using the second data processing technique(s), such as the packet processing 114, the FEC processing 116, the protocol processing 120, the encryption processing 122, and/or any other type of data processing.

The method 900, at block B910, may include sending the processed video data and the processed audio data. For instance, the CPU(s) 118 may cause the communication interface(s) 138 to send the processed video data 134 and the processed audio data 126 to the client device(s) 104. In some examples, the CPU(s) 118 sends the processed video data 134 and/or the processed audio data 126 using the pace processing 136, such as packet pacing.

Example Content Streaming System

Figure 10:
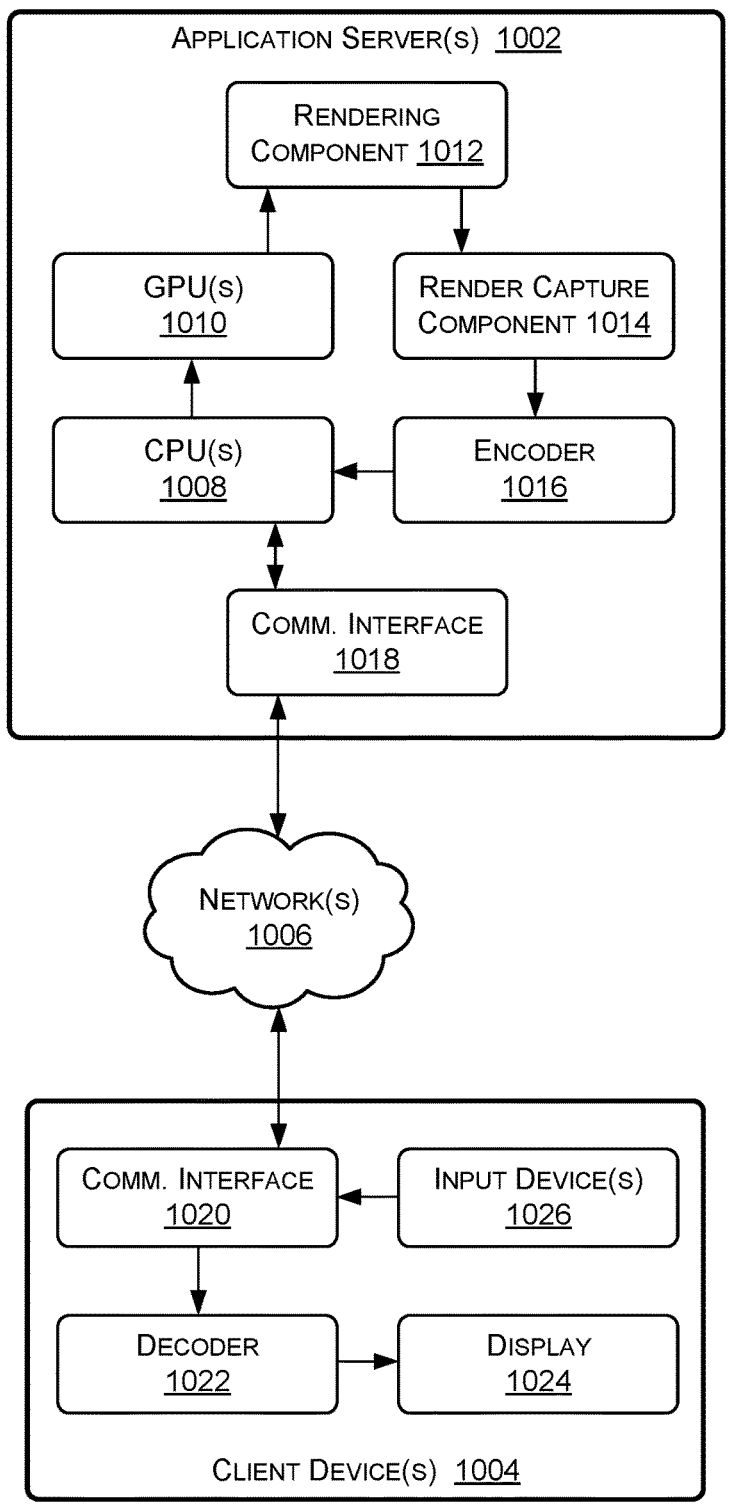
FIG. 10 is a block diagram of an example content streaming system suitable for use in implementing some embodiments of the present disclosure.

Now referring to FIG. 10, FIG. 10 is an example system diagram for a content streaming system 1000, in accordance with some embodiments of the present disclosure. FIG. 10 includes application server(s) 1002 (which may include similar components, features, and/or functionality to the example computing device 1100 of FIG. 11), client device(s) 1004 (which may include similar components, features, and/or functionality to the example computing device 1100 of FIG. 11), and network(s) 1006 (which may be similar to the network(s) described herein). In some embodiments of the present disclosure, the system 1000 may be implemented. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 1000, for an application session, the client device(s) 1004 may only receive input data in response to inputs to the input device(s), transmit the input data to the application server(s) 1002, receive encoded display data from the application server(s) 1002, and display the display data on the display 1024. As such, the more computationally intense computing and processing is offloaded to the application server(s) 1002 (e.g., rendering—in particular ray or path tracing—for graphical output of the application session is executed by the GPU(s) of the game server(s) 1002). In other words, the application session is streamed to the client device(s) 1004 from the application server(s) 1002, thereby reducing the requirements of the client device(s) 1004 for graphics processing and rendering.

For example, with respect to an instantiation of an application session, a client device 1004 may be displaying a frame of the application session on the display 1024 based on receiving the display data from the application server(s) 1002. The client device 1004 may receive an input to one of the input device(s) and generate input data in response. The client device 1004 may transmit the input data to the application server(s) 1002 via the communication interface 1020 and over the network(s) 1006 (e.g., the Internet), and the application server(s) 1002 may receive the input data via the communication interface 1018. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 1012 may render the application session (e.g., representative of the result of the input data) and the render capture component 1014 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 1002. In some embodiments, one or more virtual machines (VMs)—e.g., including one or more virtual components, such as vGPUs, vCPUs, etc.—may be used by the application server(s) 1002 to support the application sessions. The encoder 1016 may then encode the display data to generate encoded display data and the encoded display data may be transmitted to the client device 1004 over the network(s) 1006 via the communication interface 1018. The client device 1004 may receive the encoded display data via the communication interface 1020 and the decoder 1022 may decode the encoded display data to generate the display data. The client device 1004 may then display the display data via the display 1024.

Example Computing Device

Figure 11:
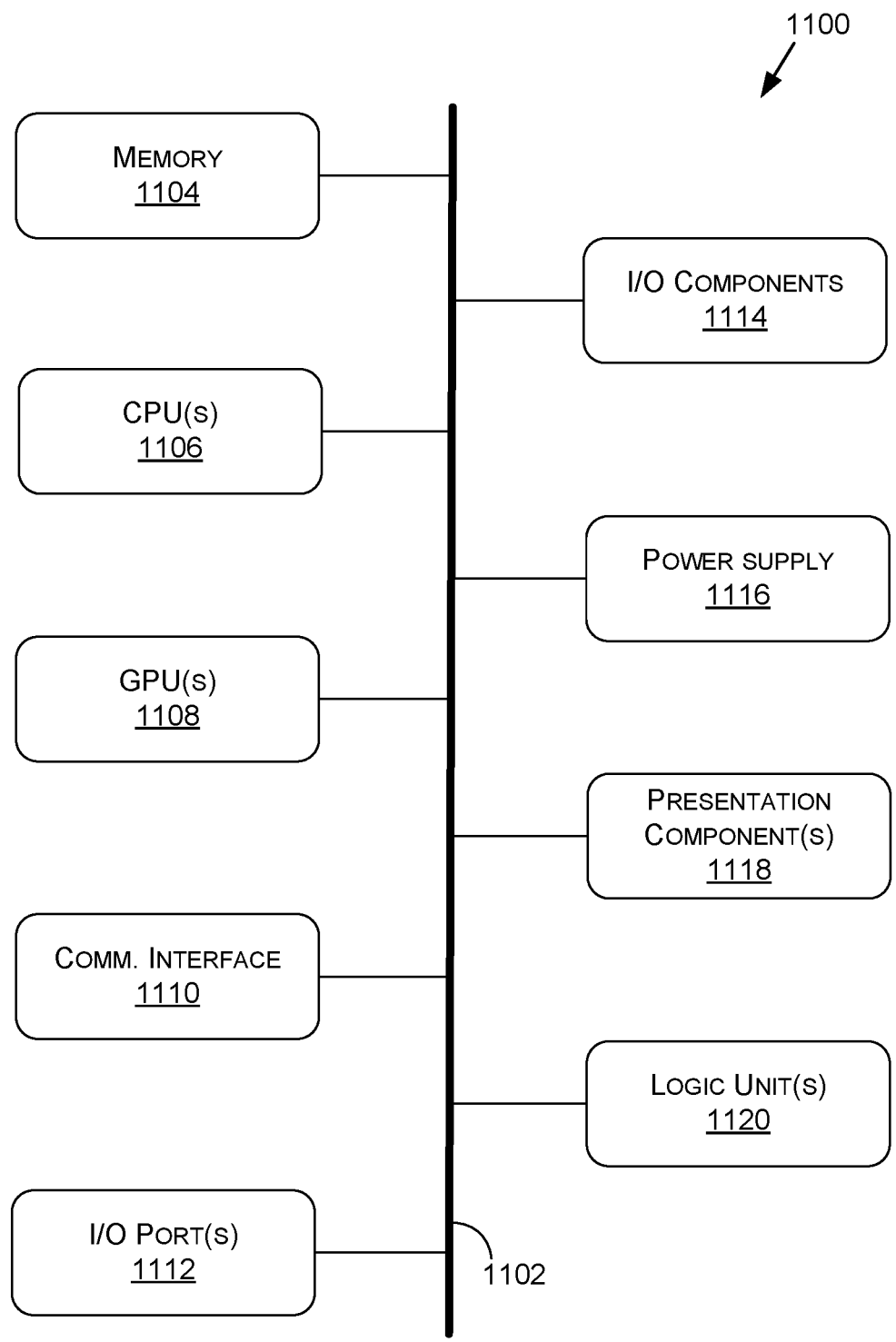
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Example Data Center

Figure 12:
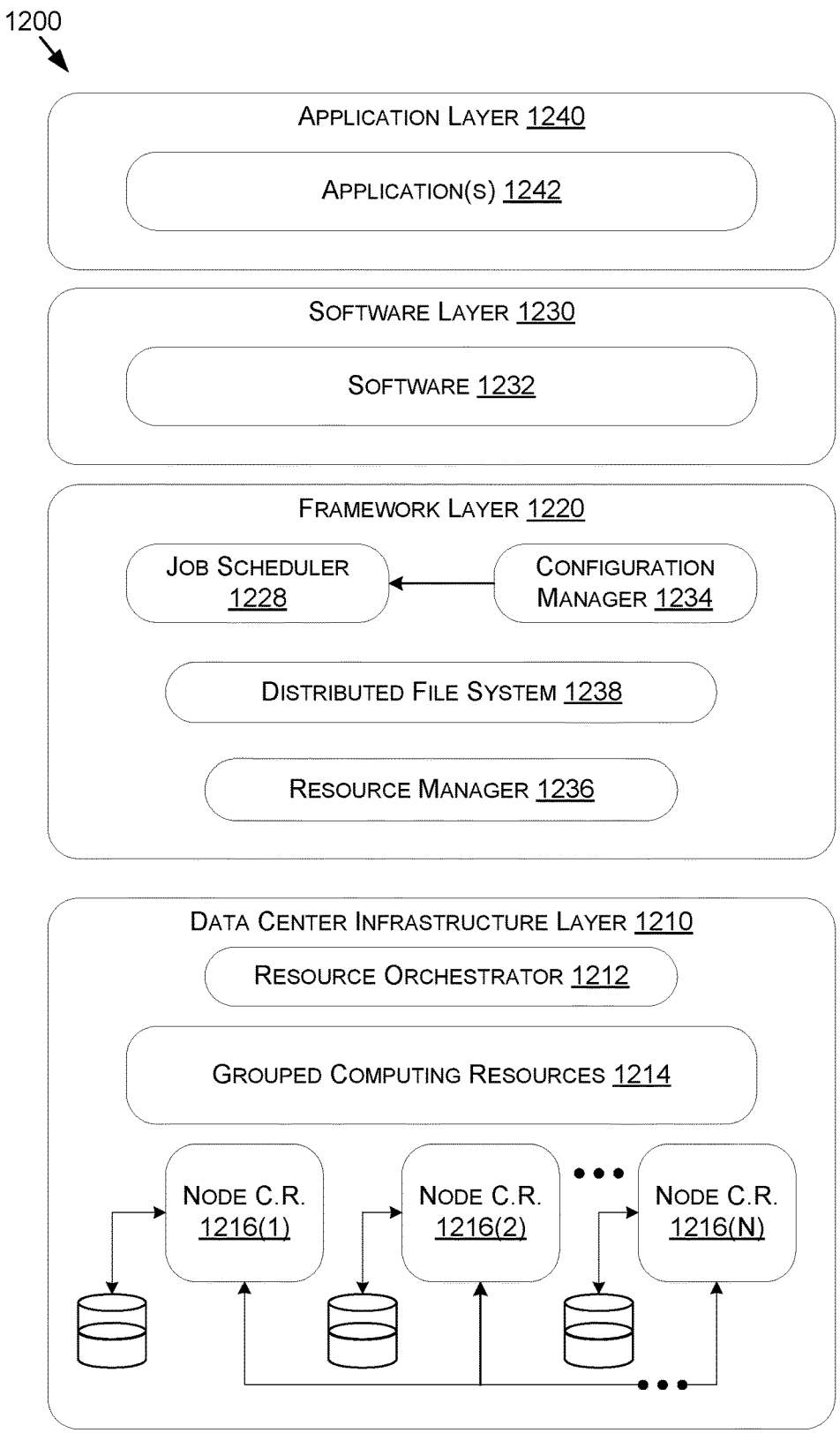
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161(N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1228, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1228 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1228. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216(1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   generating, using one or more parallel processing units, video data associated with an application;
   generating, using the one or more parallel processing units, encrypted video data by encrypting the video data;
   generating, using one or more central processing units, encrypted audio data by encrypting audio data associated with the application;
   receiving, using the one or more central processing units, the encrypted video data from the one or more parallel processing units; and
   causing, using the one or more central processing units, the encrypted video data and the encrypted audio data to be streamed to one or more client devices.

2. The method of claim 1, wherein the generating the video data, the generating the encrypted video data, and the generating of the encrypted audio data is performed by one or more remote systems that communicate with the one or more client devices via one or more networks.

3. The method of claim 1, further comprising:
   generating, using the one or more parallel processing units, processed video data by processing the video data using forward error correction,
   wherein the generating of the encrypted video data includes encrypting the processed video data.

4. The method of claim 1, further comprising:
   packetizing, using the one or more parallel processing units, at least a portion of the video data as a plurality of data packets,
   wherein the generating the encrypted video data comprises generating, using the one or more parallel processing units, a plurality of encrypted data packets by encrypting the plurality of data packets.

5. The method of claim 1, further comprising:
   generating, using the one or more parallel processing units, encoded video data by encoding the video data,
   wherein the generating the encrypted video data includes encrypting the encoded video data.

6. The method of claim 1, wherein the causing the encrypted video data and the encrypted audio data to be streamed to the one or more client devices comprises:
   processing, using the one or more central processing units, the encrypted video data and the encrypted audio data using packet pacing; and
   sending, using one or more network interfaces and based at least on the packet pacing, the encrypted video data and the encrypted audio data to the one or more client devices.

7. The method of claim 1, wherein the generating the encrypted audio data using the one or more central processing units occurs at least partially in parallel with the generating the encrypted video data using the one or more parallel processing units.

8. The method of claim 1, further comprising:
   receiving an encryption key,
   wherein:
     the generating the encrypted video data is based at least on the encryption key; and
     the generating the encrypted audio data is based at least on the encryption key.

9. The method of claim 1, further comprising:
receiving, from the one or more client devices, input data representative of one or more inputs,
wherein the generating the video data is based at least on the input data.

10. A system comprising:
one or more graphics processing units to:
    generate a first video stream associated with an application;
    generate a second video stream by encrypting the first video stream; and
    cause the second video stream to be provided to one or more central processing units; and
the one or more central processing units to:
    obtain a first audio stream associated with the application;
    generate a second audio stream by encrypting the first audio stream; and
    stream the second video stream and the second audio stream to one or more client devices.

11. The system of claim 10, wherein:
the one or more graphics processing units are further to generate a third video stream by processing the first video stream using forward error correction; and
the generation of the second video stream includes encrypting the third video stream.

12. The system of claim 10, wherein:
the one or more graphics processing units are further to generate, based at least on the first video stream, a plurality of first data packets; and
the generation of the second video stream comprises generating, using the one or more graphics processing units, a plurality of second data packets by encrypting the plurality of first data packets.

13. The system of claim 10, wherein:
the one or more graphics processing units are further to generate a third video stream by encoding the first video stream using one or more network protocols; and
the generation of the second video stream includes encrypting the third video stream.

14. The system of claim 10, wherein:
the one or more central processing units are further to process the second video stream and the second audio stream using packet pacing; and
the second video stream and the second audio stream are streamed based at least on the packet pacing.

15. The system of claim 10, wherein:
the generation of the second video stream is based at least on an encryption key; and
the generation the second audio stream is based at least on the encryption key.

16. The system of claim 10, wherein:
the one or more graphics processing units are further to receive input data representative of one or more inputs, the input data generated using the one or more client devices; and
the generation of the first video stream is based at least on the input data.

17. The system of claim 10, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

18. The system of claim 10, wherein the generation of the second video stream using the one or more central processing units occurs at least partially in parallel with the generation of the second video data using the one or more graphics processing units.

19. One or more processors comprising:
one or more graphics processing units to:
    generate a processed video stream by least processing a video stream using encryption and forward error correction, wherein generation of the video stream is based at least on input data received from one or more client devices; and
one or more central processing units to:
    generate a processed audio stream by at least processing an audio stream using encryption; and
    cause the processed video stream and the processed audio stream to be streamed to the one or more client devices.

20. The one or more processors of claim 19, wherein the one or more processors are comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

* * * * *